Figure 1:
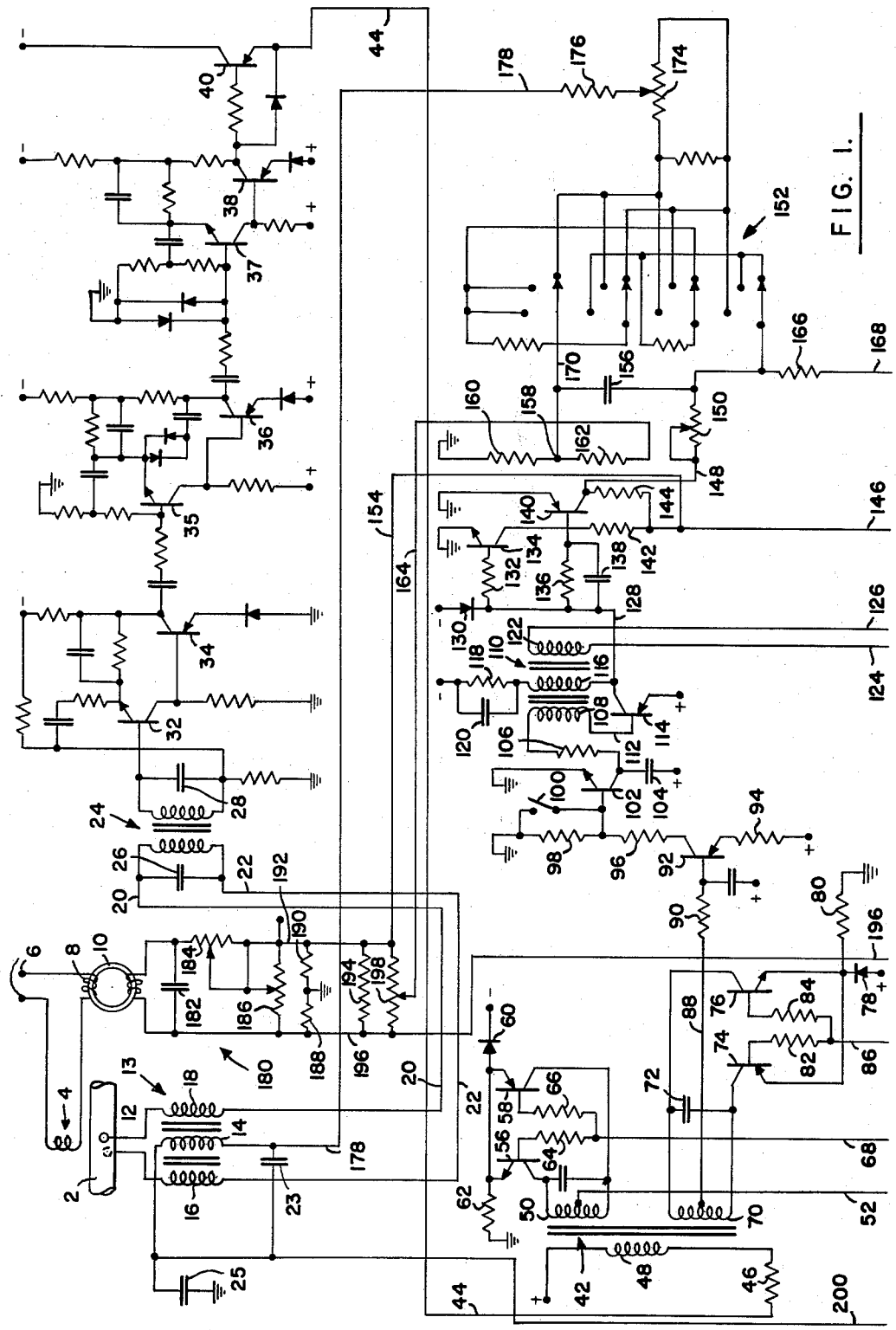

May 31, 1966 R. F. SCHMOOCK 3,254,243
MEASURING APPARATUS
Filed Aug. 22, 1963 2 Sheets-Sheet 2

INVENTOR.
ROY F. SCHMOOCK
BY
ATTORNEYS

United States Patent Office 3,254,243
Patented May 31, 1966

3,254,243
MEASURING APPARATUS
Roy F. Schmoock, Ivyland, Pa., assignor to Fischer & Porter Company, Warminster, Pa., a corporation of Pennsylvania
Filed Aug. 22, 1963, Ser. No. 303,828
8 Claims. (Cl. 307—88.5)

This invention relates to measuring apparatus and particularly to a useful element of such apparatus involving conversion of an alternating input signal into a direct current output having an amplitude accurately proportional to the input signal. The invention further relates to an apparatus using the foregoing.

The present apparatus involves various basic aspects of the apparatus disclosed in my prior application, Serial No. 189,837, filed April 24, 1962, and reference will be first made thereto. In said prior apparatus a primary concern was the derivation of a signal in the form of pulses which could be counted to give an accurate integration of a variable alternating input signal with respect to time, the input signal being at a fixed frequency such as that of the commercial sixty cycle supply. Also derivable in said prior apparatus was a measurable alternating current signal proportional to the input signal. The present apparatus differs basically from the prior apparatus in providing a direct current output signal which may be used for measurement or control purposes. The direct signal is secured in a fashion giving rise to highly accurate linear relationship to the alternating input signal, the accuracy being better than that conveniently and inexpensively secured by translation of the amplitude of an alternating signal by rectification or similar procedure.

Considering the prior apparatus, there may be first mentioned particular problems arising in matters of measurement. In the case of flow measurements it is often desirable to effect integration with respect to time of a signal proportional to rate of flow to attain a measurement of total flow. If a signal proportional to flow rate is converted into pulses having a frequency proportional to the flow rate, counting of the pulses will give the total flow. While various devices are known which will convert a direct current signal (or alternating current signals through a direct current signal) into pulses having a frequency more or less proportional to that signal, such devices are generally rather non-linear, inaccurate, and subject to drifts. The devices mentioned are, variously, multivibrators, blocking oscillators, or the like.

In accordance with said prior apparatus, this result is achieved but in an indirect fashion, with achievement of a high degree of accuracy and practically complete independence of changes of circuit components, variations of supply voltages, temperature, and the like. A main component of said apparatus is a converter of frequency to an alternating current signal having an amplitude accurately linearly proportional to the frequency. This is achieved by sampling an alternating reference signal by relatively higher variable frequency signals to give an output which is in phase with the reference signal and which has an amplitude proportional to the variable frequency.

Specifically, let us consider an electromagnetic flowmeter. In such a flowmeter a magnetic field extends transversely of a flowing fluid and electrodes which are at right angles to the direction of flow and also to the magnetic field have produced in them signals proportional to the rate of flow. It has been found that for practical operation, and particularly to obtain useful signals, which are generally very small against a high noise background, the magnetic field should be alternating, so that the signals picked up by the electrodes are also alternating at the frequency of the supply giving rise to the field. A typical flowmeter of this type is described in the patent to Head, No. 3,005,342, dated October 24, 1961. As disclosed in that patent, a feedback is provided bucking the electrode signals to provide an error signal which is amplified to control the feedback signal in such a fashion as to reduce the error signal substantially to zero. The feedback signal is measured to give the rate of flow. Causing the feedback signal to give rise to pulses having a frequency proportional to its amplitude, the counting of such pulses gives an integration with respect to time of the flow rate, serving as a measure of total flow.

In accordance with said prior apparatus the feedback signal is not converted into pulses directly; rather, there is utilized a system as follows:

A nulling feedback is provided so that, as heretofore stated, an error signal is produced. This error signal controls a variable frequency generator, but the control of this generator need not be at all carefully related to the controlling error signal, non-linearity and drift being permissible. The pulses from the variable signal generator are used to sample a reference alternating voltage which is in phase with the signals picked up by the electrodes. This sampling gives rise to an alternating signal in phase with the reference signal but which has an amplitude very accurately proportional to the frequency of the variable frequency pulses. This last signal, then, provides the feedback bucking the electrode signal.

The result of this system can now be appreciated. Unless the feedback produces a substantially zero error signal, the error signal will produce variations in the variable frequency pulses until the error signal is nulled. When this occurs, the pulse frequency is an accurate linear measurement of the amplitude of the feedback signal and, therefore, the signal picked up by the electrodes to which it is equated. Counting of the pulses then gives a highly accurate measure of the total flow.

In electromagnetic flowmeters attention must be given to the suppression of quadrature signals, and in said apparatus a system generally similar to that involved in connection with the desired signals is used to provide a quadrature feedback. But the pulses then involved have no significance with respect to their frequency, and consequently a less accurate frequency-to-amplitude signal converter may be used to achieve the nulling of the quadrature signal.

The apparatus of the present invention has considerable resemblance to what has just been described, but, being intended to give rise to an accurate direct current signal linearly proportional to flow rate, and involving no aspect of integration to secure measurement of total flow, may be considerably simpler in some respects. In the prior apparatus the sampling by the variable frequency pulses involves the aspect of having these pulses of accurately constant duration. In the present apparatus the in-phase feedback signal is derived by pulse sampling of a reference in-phase signal; but the counting of pulses not being significant, they may have variable durations (within limits) and the amplitude of the derived feedback signal is not proportional to frequency alone but is proportional to frequency times duration, or to what may be called the "duty cycle" of the pulses. One object of the present invention is to provide a direct current output in accordance with the frequency times duration products thus involved.

In line with this concept each of the variable pulses produced may have its "magnitude" defined as its amplitude times its duration.

From the standpoint of advantages, the present invention provides an output in a fashion involving a number of outstanding advantages. Outputs are readily convertible to signals in different direct current ranges for utilization in measurement or control. The direct current portion of the system is capable of accepting an external power supply and is adapted to remote loads, with a minimum of wired connections to a remote station and power supply. Operation is highly independent of range variations of load resistance. Linearity is securable to better than ±0.25% of maximum output. Variations of line voltage of ±10% will not cause a scale factor change of greater than ±0.1% of maximum. The apparatus is highly independent of temperature variations and an ambient temperature variation of −25° C. to 55° C. will not produce a scale factor change of more than ±0.25% of maximum. When used with an electromagnetic flowmeter measurements may be made with conductivities between the pickup electrodes as low as 20 micromhos. Adjustments may be made to produce full scale outputs for flow rates ranging from 3 to 30 feet per second.

The foregoing characteristics are typical of those achievable concurrently through the use of the apparatus.

Figure 2:
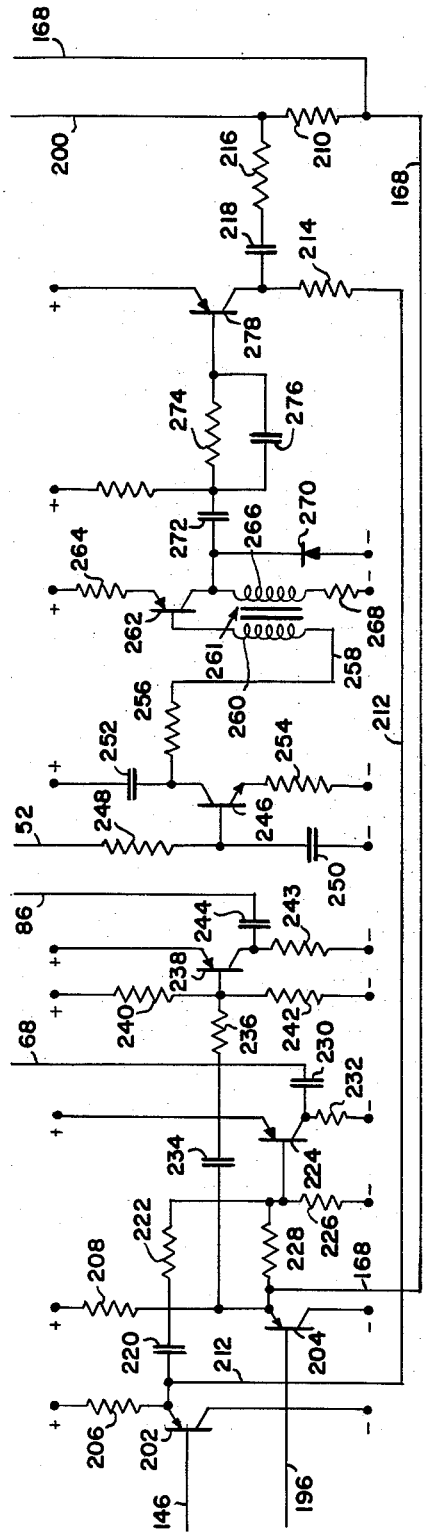
Figure 3:
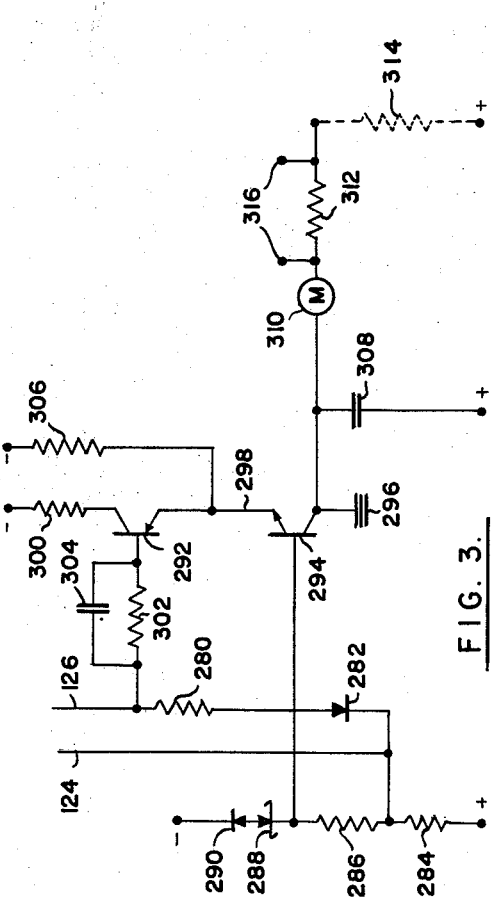

Further objects of the invention relate to the achievement of the foregoing characteristics and to details of construction and operation, and will become more apparent from the following description, read in conjunction with the accompanying drawings, in which:

FIGURE 1 is a schematical diagram showing in part, a preferred form of apparatus provided in accordance with the invention; and FIGURES 2 and 3 are schematic diagrams showing continuations of the circuitry of FIGURE 1, connections between the figures being indicated.

A conduit 2 carries the fluid (usually a liquid) the flow of which is to be measured. An electromagnet, the construction of which is conventional and need not be described, provides a magnetic field transverse to the direction of flow, excitation being provided from one or more windings 4 connected to an alternating current supply source indicated at 6 which may be, for example, the usual 60 cycle lines, there being in series with the winding 4 the primary 8 of a toroidal transformer 10 the purpose of which will be later described. For consistency, 60 cycle operation will be assumed, through obviously this is quite arbitrary.

Electrodes 12 in contact with the flowing fluid are arranged on a transverse line which is perpendicular both to the direction of flow and the magnetic field. As is well known, the flow provides an alternating signal through these electrodes which is substantially proportional to the flow rate. A transformer 13 has a primary winding 14 and two secondaries 16 and 18 each of which has one terminal connected to a respective electrode 12. As will appear, an input to the primary winding 14 is arranged to buck the signals from the electrodes, the connections being properly made, so that an error signal is provided between the leads 20 and 22. The primary winding 14 also provides a quadrature signal to null quadrature components at the output of an amplifier.

A capacitor 23 is connected across the primary winding 14 of the transformer to bypass higher frequency signals and transients, and its upper terminal is connected to the ground of the system through the capacitor 25.

The leads 20 and 22 feed the primary winding of a transformer 24, the primary winding being shunted by a capacitor 26 while the secondary is shunted by a capacitor 28 to provide tuning at the supply frequency. The secondary of transformer 24 feeds an amplifier of high gain type which is conventional and comprises the successive transistors 32, 34, 35, 36, 37, 38 and 40, feedbacks being provided to secure reasonable fidelity of amplification. It will be understood that many types of high grade and high gain amplifiers may be here used.

The output of the amplifier through line 44 and resistor 46 feeds the primary winding 48 of a transformer 42. A first secondary winding 50 has a center tap connected to a line 52 hereafter described with reference to FIGURE 2. This transformer secondary 50 is tuned approximately to the supply frequency by a capacitor 54. The terminals of the secondary winding 50 are connected to the respective collectors of a pair of transistors 56 and 58, the former being of the npn type and the latter of the pnp type. The emitters of these transistors are connected to the junction between a diode 60 and a resistor 62, connected as shown between ground and a negative supply terminal. The bases of the transistors 56 and 58 are connected through the respective equal resistors 64 and 66 to a line 68, continued in FIGURE 2. As will appear later, the circuitry just described serves as a demodulator of quadrature residual signals from the amplifier.

Continuing the description of FIGURE 1, a second secondary 70 of the transformer 72 is associated with a generally similar demodulator circuit. This secondary is tuned to the base frequency by a capacity 72, and the terminals of the secondary 70 are connected respectively to the collectors of a pair of transistors 74 and 76. These transistors, also respectively of pnp and npn type, have their emitters connected together to the junction between a diode 78 and a resistor 80, connected between a positive supply terminal and ground. Their bases are respectively connected through the equal resistors 82 and 84 to the line 86 which is continued in FIGURE 2.

The center tap of the secondary winding 70 is connected through resistor 90 to the base of transistor 92 the emitter of which is connected to a positive supply terminal through resistor 94. Its collector is connected to ground through the series arrangement of resistors 96 and 98, the latter of which is adapted to be shorted by a switch 100. The junction between resistors 96 and 98 is connected to the base of a transistor 102, the emitter of which is grounded while its collector is connected through capacitor 104 to the positive supply terminal. A direct current connection between the collector of transistor 102 and the base of a transistor 114 is provided through resistor 106 and one of the windings 108 of a transformer 110, the last connection being completed at 112. The transformer 110 in conjunction with the transistor 114 provides a blocking oscillator arranged to produce pulses at variable rates, the oscillator normally operating to produce pulses at a frequency considerably in excess of the alternating supply frequency. The emitter of transistor 114 is connected to the positive supply terminal while is collector is connected through the winding 116 of transformer 110 and through the RC circuit 118, 120 to a negative supply terminal. As will more fully appear hereafter, the frequency of pulse production by this blocking oscillator is controlled by the direct bias of the base of transistor 114, which bias results from the demodulation of the signals from the amplifier through the secondary 70 of transformer 42. A pulse output is taken from the transformer 110 through its winding 122 and delivered to the lines 124 and 126, continued in FIGURE 3. The lower terminal of winding 116 is connected at 128 to several elements, this connection being returned to the negative supply terminal through the reversely arranged diode 130. Line 128 is connected through resistor 132 to the base of transistor 134, the emitter of which is grounded. The collector of this transistor is connected through resistor 142 to line 146. The line 128 is also connected through the parallel RC arrangement 136, 138 to the base of transistor 140. The emitter of this transistor is also grounded, and it will be noted that the respective transistors 134 and 140 are of the npn and pnp type. The collector of transistor 140 is connected through resistor 144 to the line 146.

The collector of transistor 140 is connected at 148 through the variable resistor 150 to a variable attenuation network 152. A pair of resistors 160 and 162 have their junction point 158 connected through capacitor 156 to the right hand terminal of variable resistor 150. The upper terminal of resistor 160 is connected to ground, while the lower terminal of resistor 162 is connected at 164 to a network hereafter described. The right-hand terminal of variable resistor 150 is also connected through resistor 166 to the line 168 continued in FIGURE 2. The effective inputs to the attenuator network 152 are shown at 170 and 172. Output from the network is taken from potentiometer 174, the adjustable contact of which is connected through resistor 176 to line 178 which runs to the lower terminal of the winding 14 of transformer 13.

The secondary winding of the toroidal transformer 10 feeds a network indicated generally at 180. A capacitor 182 bridges the terminals of this transformer secondary, and one of its terminals is connected to the line 196 which runs to FIGURE 2. The other secondary terminal is connected through variable resistor 184 to a line 192 which is connected to the line 154 previously mentioned. A variable resistor 186 is connected between the line 192 and the line 196. A pair of equal resistors between these lines indicated at 188 and 190 have their junction grounded. A further resistor 194 connects these lines which are also connected by a potentiometer 198 the variable contact of which is connected to the line 164.

A line 200 running to FIGURE 2 is connected to the upper terminal of winding 14 of the transformer 13. This connection, it will be noted, is also to the ungrounded terminal of capacitor 25.

Now referring particularly to FIGURE 2, the connections 146 and 196 from FIGURE 1 run to the respective bases of the transistors 202 and 204 which are arranged as emitter followers, involving the emitter resistors 206 and 208. The emitter of transistor 202 is connected through line 212 to the lower terminal of resistor 214, while the emitter of transistor 204 is connected to line 168 running to FIGURE 1 and connected to the lower terminal of a resistor 210, the upper terminal of which is connected to the line 200. The upper terminals of the resistors 210 and 214 are connected through the series arrangement of resistor 216 and capacitor 218.

The emitter of transistor 202 is connected through capacitor 220 and resistor 222 to the base of transistor 224, there being a resistor 226 between this base and the negative supply terminal. The emitter of transistor 204 is connected to the base of transistor 224 through resistor 228. Transistor 224 constitutes an amplifier having a collector resistor 232, the collector being connected through capacitor 230 to the line 68. The emitter of transistor 204 is connected through capacitor 234 and resistor 236 to the base of a transistor 238 which base is biased by connection to the junction of resistors 240 and 242 constituting a voltage divider between the positive and negative supply terminals. The collector of transistor 238 is connected through load resistor 242 to the negative supply terminal and provides an output to the line 86 through capacitor 244.

A transistor 246 is connected through resistor 248 to the line 52, and is connected to the negative supply terminal through capacitor 250. The transistor 246 provides a direct current amplifier and has its emitter connected to the negative supply terminal through resistor 254, while its collector, connected to the positive supply terminal through capacitor 252 provides a direct output through resistor 256 and the winding 260 of transformer 261 to the base of transistor 262 which provides with the transformer 261 a second blocking oscillator. The emitter of transistor 262 is connected to the positive supply terminal through resistor 264, while its collector is connected to the negative supply terminal through the transformer secondary 266 and a resistor 268. A diode 270, polarized as indicated, is connected between the collector of transistor 262 and the negative supply terminal.

Output from the blocking oscillator is provided through capacitor 272 and the RC network 274, 276 to the base of transistor 278. The collector of this transistor is connected to the junction of resistor 214 and capacitor 218 previously mentioned, while its emitter is connected to the positive supply terminal.

Referring to FIGURE 3, the line 126 running from the winding 122 of the blocking oscillator transformer 110 (FIGURE 1) is connected through resistor 280 and diode 282 to the junction of a pair of resistors 284 and 286 in series with the Zener diode 288 and the temperature compensating diode 290 between the positive and negative supply terminals. The line 124 running from the secondary 122 of transformer 110 is connected to the junction between resistors 284 and 286.

A pair of transistors 292 and 294 are arranged in series, the latter being of power type and having its collector connected to the heat sink 296. The emitters of these two transistors are connected by line 298. The collector of transistor 292 is connected to the negative supply terminal through resistor 300. The base of this transistor is connected to the line 126 through the RC network 302, 304. The transistor 292 provides a switch and the transistor 294 provides a duty cycle-to-current converter. The connection 298 is connected to the negative supply terminal through a resistor 306 which provides a current offset.

The collector of transistor 294 is bypassed for varying components to the positive supply terminal through capacitor 308 and is connected through a monitoring meter 310 and resistor 312 to what may be a remote load indicated as resistor 314 returned to the positive supply terminal. This load may be constituted by any suitable type of remote meter of recording or visual type. As will be stressed later, this external resistance at 314 may be varied greatly without any appreciable change in the current delivered from the collector of transistor 294.

The ends of resistor 312 are connected to terminals indicated at 316 from which a millivolt output may be provided to a suitable meter if desired.

The general aspects and operation of the apparatus may now be indicated as follows:

Various of the basic aspects of operation are the same as those involved in said Head Patent 3,005,342, already referred to, and these need not be detailed herein. From the overall standpoint there is the difference that the feedback is electrically produced without mechanical parts. Further, the operation has many aspects in common with that of my application Serial No. 189,837 above referred to, and reference may be made thereto for other details of operation. The following description will, therefore, stress primarily those operational aspects involved in the present invention. From a general standpoint, the differences from the apparatus described in said prior application involve the sampling, for feedback, of an alternating wave by means of pulses which may vary in both frequency and duration as contrasted with sampling by variable frequency pulses of fixed duration. The variable frequency-variable duration pulses sample a direct current reference of accurately fixed amplitude to produce, by averaging, a direct output which is an accurate measure of flowrate, when the apparatus is used in connection with a flowmeter, or of another variable quantity in another type of use.

The output of the electromagnetic flowmeter electrodes 12 is delivered to the windings of transformer 13 wherein the winding 14 provides nulling signals of both in-phase and quadrature types, the error signal representing unbalance passing through leads 20 and 22 to the input of the high grain amplifier which runs from the transformer 24 through the emitter follower 40. While this amplifier desirably has stability-maintaining aspects and characteristics minimizing the derivation of quadrature signals, its operation is essentially conventional and it need not be described in detail.

The output from the emitter follower 40 is directed through resistor 46 and the primary winding 48 of the transformer 42 which has the two secondaries 50 and 70 respectively forming parts of synchronous demodulators for in-phase and quadrature signals. Consideration will first be given to the in-phase demodulator associated with the secondary 70. The procedure for synchronous demodulation is essentially the same as described in detail in said application Serial No. 189,837 and need be only briefly described. The pnp and npn transistors 74 and 76 in effect form switches responsive to in-phase square waves introduced through line 86. It will be noted that they are essentially powered by the output of the secondary of transformer 70, and the action is such that the in-phase component of the output of the amplifier is transformed into a direct signal with alternating components filtered out by the combination of resistor 90 and capacitor 91. The direct signal which may be positive or negative depending upon the direction of unbalance is fed to the base of transistor 92 providing direct current amplification. Quadrature signals and stray signals of other frequencies do not contribute to the direct signal imparted to the base of the transistor 92.

Direct amplification is further carried out through transistor 102 which controls through resistor 106 and the winding 108 of transformer 110 the bias on the base of the transistor 114 of the blocking oscillator which operates in usual fashion with feedback from the winding 116 to winding 108. The blocking oscillator is so designed that through the useful range of operation it provides pulses at a frequency considerably exceeding the assumed 60 cycle frequency signals emanating from the flowmeter.

Whereas in said prior application provisions were made to insure constancy of sampling pulse duration, because of the desire to count pulses as a measure of total flow, no necessity for this is involved in the present apparatus, and sampling pulses are produced which may vary in duration as well as in frequency, though the frequency is primarily responsible for the results, variation in duration of the sampling pulses being incidental.

Continuing, now, to the matter of sampling, this is effected as follows:

It will be noted that the network indicated generally at 180 receiving an input from the toroidal transformer 10, the primary of which is in series with the energizing winding 4 of the flowmeter provides an output relative to ground through the connection 154 which continues as connection 146. The latter is not involved directly in the operation being immediately described, but it is important that phase relationship be maintained in the several connections to these lines. Negative pulses through line 128 are suppressed by the diode 130, positive pulses being utilized. The positive pulses are fed to the bases of the respective transistors 132 and 140 which are of npn and pnp type. Due to the connections of their collectors to the reference alternating signal through line 154, these transistors respectively produce pulse samples from the reference signal through the connection 148 to the attenuation circuit 152, smoothing being effected by the capacitor 156 so that introduced to this scaling or attenuation circuit is a 60 cycle in-phase signal which passes from the circuit 152 through the feedback line 178 providing an in-phase nulling component in the winding 14 of transformer 13. The adjustments in the circuit 152 are to control responses to various ranges of flow rate typically, for example, such that full scale operation is achieved for flow rates ranging, in steps, from one to 30 feet per second.

What is involved in the sampling is essentially this:

A single sampling pulse may have a somewhat arbitrary duration, though the circuit components are so chosen that the duration is always less than the interval between pulses of the blocking oscillator when operating at its highest repetition rate. A single pulse, sampling the alternating reference signal, will contribute to the output a signal proportional to its duration and to the value of the reference signal at the time of sampling. The magnitude of the last-mentioned signal, which will be a pulse, may be defined as the product of its amplitude and its duration. When the series of pulses are considered, the total component will be proportional to the product of the frequency of the sampling signals and their duration (assuming that the duration does not vary rapidly) or more accurately, it may be said that the contribution for each complete cycle of the sampled wave will be proportional to the integral of the product of frequency times duration and to the amplitude of the sampled wave. The "duty cycle" of the sampling signal is thus involved rather than merely its frequency. It is, of course, the frequency which is primarily varied by the bias on the base of the blocking oscillator transistor 114, the frequency varying greatly with even small changes in the error signal applied to the amplifier through transformer 24. The pulse durations may change with the frequency change or due to other matters involved in operation such as drift; but since the sampling is on a duty cycle basis, it is immaterial that contributions to the sampling are both by frequency variation and by pulse duration variation. Variations in pulse duration are generally small during any cycle of the sampled wave. The feedback, of course, is in opposite phase to the output signal from the electrodes so that nulling of the in-phase component is effected.

The foregoing describes the production of an alternating signal which is fed back and which has an amplitude accurately proportional to the electrode signals. But alternating currents are not accurately measurable without considerable complexity of apparatus and the exercise of great care in the prevention of errors. The primary purpose of the present invention is to convert the duty cycle sampling to a direct current which will form a very accurate measurement of flow. It will be noted that the transformer 110 has a third winding 122 feeding a pulse output through the lines 124 and 126 to the portion of the circuit illustrated in FIGURE 3, which portion of the circuit constitutes the duty cycle-direct current converter.

Assuming, first the quiescent condition existing between pulses, or as it would be in the absence of pulses, though a range of operation is so chosen that pulses of a lower frequency are always produced by the blocking oscillator, attention may be first directed to the transistor 294. This, of n-p-n type, has its emitter running to the negative supply terminal through a resistor 306, while its base is connected to the lower terminal of the Zener diode 288, which terminal is connected through the series arrangement of resistors 284 and 286 to the positive supply terminal. The upper terminal of the Zener diode is connected through diode 290, provided for temperature compensation, to the negative supply terminal. The base of transistor 294, therefore, is constantly at a fixed potential which may be typically nine volts positive with respect to the negative supply terminal. In the quiescent condition (transistor 292 being cut off) it will be evident that a current will flow through the emitter or transistor 294 which will be determined by the resistor 306 and quite constant. As is well known, a current thus produced is quite independent of the potential applied to the collector of the transistor so long as this is adequate, the current to the collector being provided from the positive supply source through the load resistor 314 and resistor 312 and the monitoring meter. As has already been indicated, the resistor 314 may vary through a quite large range of values depending upon the particular load imposed. This load may be a remote direct current meter of indicating or recording type, or may be a control element of any of a quite variety of types, one advantage of the invention being that the arrangement permits great freedom of choice of the value of the load without effect on the current value therethrough, and also quite independent of the variation of potential of the positive supply terminal with respect to the negative terminal. It is desired that in the quiescent state the direct current flowing through the load should have a definite minimum value other than zero, and the resistor 306 provides an offset condition which may typically involve a current flow of about 4 milliamperes for this quiescent condition.

It was stated above that the transistor 292 was cut off during quiescent periods. This is due to the fact that its base is ordinarily at a positive potential relative to its emitter by reason of the connection through resistor 302, line 126, winding 122 and line 124 to the junction between the resistors 284 and 286, this junction being positive with respect to the base of transistor 294 and its emitter.

Positive pulses on line 126 relative to line 124 drive the base of transistor 292 more positive thereby maintaining cut off. But negative pulses on line 126 relative to line 124, the sampling pulses, drive the base of transistor 292 negative, diode 282 blocking current flow, so that, these pulses being of sufficient amplitude, produce a highly conductive condition of transistor 292. The resistor 300 is now primarily responsible for determining the current flowing from the emitter of transistor 294 (in parallel with resistor 306) and thus pulses are produced which have a relatively large but fixed amplitude, the fixed amplitude being again due to the fact that the base of transistor 294 is at a fixed potential relative to the negative supply terminal with the current substantially independent of the potential of its collector. Smoothing is provided by the large filter capacitor 308 so that a direct current flows through the load 314, the resistor 312 and the monitoring meter which is very accurately proportional to the integrated product of frequency times pulse duration. Since the alternating feedback current which is proportional to the electrode signals is also proportional to this duty cycle integral, it will be evident that the direct current constitutes an accurate measure of the electrode signals.

The remaining portions of the circuit involve operations generally similar to what exists in my prior application, and these operations need not be referred to in great detail. Quadrature signals must be suppressed because of the possibility that, by phase shifts, they may give rise to spurious in-phase signals, and suppression of these is controlled through a loop starting with the discriminator associated with the secondary winding 50 of transformer 42. As will be evident from FIGURE 1, a synchronous rectification system is provided comprising the transistors 56 and 58 and their connections which is basically similar to that described for the in-phase signals. The line 68 provides switching square wave to the bases of these transistors. The output is along line 52, and this through the direct current amplifier transistor 246 controls the bias on the base of the blocking oscillator transistor 262 with which is associated the feedback transformer 261. Here again a duty cycle type of sampling takes place as in the case of the in-phase system, but sampled is the reference signal from connection 146 through the emitter follower 202 which is in-phase. The samples are emitted through line 200 which (FIGURE 1) runs to the ungrounded terminal of the capacitor 25 which provides phase shift of the resulting alternating component to a quadrature signal opposing quadrature components at the transformer 13. Automatic nulling of quadrature signals is thus effected. Since there is no interest in measuring the quadrature signals, only the nulling action is of consequence.

Finally, brief reference may be made to the portion of the circuit running from the lines 146 and 196 of FIGURE 2 through to the lines 68 and 86. Here involved are the emitter followers 202 and 204 which control the gating transistors 224 and 238 to provide the square waves which form the references along lines 68 and 86 to the discriminators previously discussed, suitable phase shifts being provided, as will be obvious, by the resistor-capacitor elements in this portion of the circuit. It will be understood that components are suitably chosen and adjusted to secure the desired phase relationships as will be evident to those skilled in the art.

It will now be evident that various changes in details of construction and operation may be provided without departing from the invention as defined in the following claims.

What is claimed is:

1. In combination, means providing an input circuit, means providing a variable signal to said input circuit, a variable frequency pulse generator, means responsive to output signals from said input circuit to control the frequency of pulses produced by said generator, means providing a reference signal having the same time-function form as said variable signal, means responsive to pulses produced by said generator to sample said reference signal at the frequency of said pulses to produce variable pulses each of which has a magnitude approximately proportional to the amplitude of said reference signal at the time of sampling, means smoothing said variable pulses and providing to said circuit a second signal opposing and having the same time-function form as said variable signal to effect substantial nulling of said variable signal at the output of said input circuit, a direct current source, means providing second pulses produced by said generator at the frequency of the first mentioned pulses produced by said generator, means responsive to said second pulses to sample the direct current source to produce further pulses, and means smoothing said further pulses to provide a direct current.

2. In combination, means providing an input circuit, means providing a variable alternating signal to said input circuit, a variable frequency pulse generator, means responsive to output signals from said input circuit to control the frequency of pulses produced by said generator, said frequency being substantially greater than that of said alternating signal, means providing a reference signal having the frequency of said alternating signal, means responsive to pulses produced by said generator to sample said reference signal at the frequency of said pulses to produce variable pulses each of which has a magnitude approximately proportional to the amplitude of said reference signal at the time of sampling, means smoothing said variable pulses and providing to said circuit a second alternating signal opposing said variable signal to effect substantial nulling of said variable signal at the output of said input circuit, a direct current source, means providing second pulses produced by said generator at the frequency of the first mentioned pulses produced by said generator, means responsive to said second pulses to sample the direct current source to produce further pulses, and means smoothing said further pulses to provide a direct current.

3. In combination, means providing an input circuit, means providing a variable signal to said input circuit, a variable frequency pulse generator, means responsive to output signals from said input circuit to control the frequency of pulses produced by said generator, means providing a reference signal having the same time-function form as said variable signal, means responsive to pulses produced by said generator to sample said reference signal at the frequency of said pulses to produce variable pulses each of which has a magnitude approximately proportional to the amplitude of said reference signal at the time of sampling, means smoothing said variable pulses and providing to said circuit a second signal opposing and having the same time-function form as said variable signal to effect substantial nulling of said variable signal at the output of said input circuit, a direct current source, means providing second pulses produced by said generator at the frequency of the first mentioned pulses produced by said generator, means responsive to said second pulses to sample the direct current source to produce further pulses, and means smoothing said further pulses to provide a direct current, said direct current source providing one substantially constant output in the absence of said second pulses and another substantially constant output at the time of sampling by said second pulses.

4. In combination, means providing an input circuit, means providing a variable alternating signal to said input circuit, a variable frequency pulse generator, means responsive to output signals from said input circuit to control the frequency of pulses produced by said generator, said frequency being substantially greater than that of said alternating signal, means providing a reference signal having the frequency of said alternating signal, means responsive to pulses produced by said generator to sample said reference signal at the frequency of said pulses to produce variable pulses each of which has a magnitude approximately proportional to the amplitude of said reference signal at the time of sampling, means smoothing said variable pulses and providing to said circuit a second alternating signal opposing said variable signal to effect substantial nulling of said variable signal at the output of said input circuit, a direct current source, means providing second pulses produced by said generator at the frequency of the first mentioned pulses produced by said generator, means responsive to said second pulses to sample the direct current source to produce further pulses, and means smoothing said further pulses to provide a direct current, said direct current source providing one substantially constant output in the absence of said second pulses and another substantially constant output at the time of sampling by said second pulses.

5. In combination, means providing an input circuit, means providing a variable signal to said input circuit, a variable frequency pulse generator, means responsive to output signals from said input circuit to control the frequency of pulses produced by said generator, means providing a reference signal having the same time-function form as said variable signal, means responsive to pulses produced by said generator to sample said reference signal at the frequency of said pulses to produce variable pulses each of which has a magnitude approximately proportional to the amplitude of said reference signal at the time of sampling, means smoothing said variable pulses and providing to said circuit a second signal opposing and having the same time-function form as said variable signal to effect substantial nulling of said variable signal at the output of said input circuit, a direct current source, means providing second pulses produced by said generator at the frequency of the first mentioned pulses produced by said generator, means responsive to said second pulses to sample the direct current source to produce further pulses, and means smoothing said further pulses to provide a direct current, said direct current source comprising a transistor having base, emitter and collector elements, a potential source, a pair of connections between said emitter and one terminal of the potential source, one of said connections including a resistor and the other of said connections including a resistor and a switching element, means providing a load between said collector and the other terminal of the potential source, and means maintaining said base at a substantially constant potential with respect to the first mentioned terminal of the potential source, said means responsive to said second pulses including a connection through which said second pulses control said switching element.

6. The combination of claim 5 in which the switching element is a second transistor.

7. In combination, means providing an input circuit, means providing a variable alternating signal to said input circuit, a variable frequency pulse generator, means responsive to output signals from said input circuit to control the frequency of pulses produced by said generator, said frequency being substantially greater than that of said alternating signal, means providing a reference signal having the frequency of said alternating signal, means responsive to pulses produced by said generator to sample said reference signal at the frequency of said pulses to produce variable pulses each of which has a magnitude approximately proportional to the amplitude of said reference signal at the time of sampling, means smoothing said variable pulses and providing to said circuit a second alternating signal opposing said variable signal to effect substantial nulling of said variable signal at the output of said input circuit, a direct current source, means providing second pulses produced by said generator at the frequency of the first mentioned pulses produced by said generator, means responsive to said second pulses to sample the direct current source to produce further pulses, and means smoothing said further pulses to provide a direct current, said direct current source comprising a transistor having base, emitter and collector elements, a potential source, a pair of connections between said emitter and one terminal of the potential source, one of said connections including a resistor and the other of said connections including a resistor and a switching element, means providing a load between said collector and the other terminal of the potential source, and means maintaining said base at a substantially constant potential with respect to the first mentioned terminal of the potential source, said means responsive to said second pulses including a connection through which said second pulses control said switching element.

8. The combination of claim 7 in which the switching element is a second transistor.

No references cited.

ARTHUR GAUSS, *Primary Examiner.*

J. BUSCH, *Assistant Examiner.*